US006843366B2

(12) United States Patent
Shiotani

(10) Patent No.: US 6,843,366 B2
(45) Date of Patent: Jan. 18, 2005

(54) CURVED CONVEYOR

(75) Inventor: Yousuke Shiotani, Nagoya (JP)

(73) Assignee: Startechno Co. Ltd., Nagoya (JP)

( * ) Notice: Subject to any disclaimer, the term of this patent is extended or adjusted under 35 U.S.C. 154(b) by 0 days.

(21) Appl. No.: 10/437,719

(22) Filed: May 13, 2003

(65) Prior Publication Data
US 2004/0118662 A1 Jun. 24, 2004

(30) Foreign Application Priority Data
Dec. 24, 2002 (JP) .......................................... 2002-371355

(51) Int. Cl.⁷ ........................ B65G 15/02; B65G 21/16; B65G 15/54; B65G 17/38
(52) U.S. Cl. ....................................... 198/831; 198/849
(58) Field of Search ................................. 198/831, 838, 198/841, 849

(56) References Cited

U.S. PATENT DOCUMENTS

| 3,217,861 | A | * | 11/1965 | Daniluk et al. ............... 198/831 |
| 3,838,767 | A | * | 10/1974 | Taylor ........................... 198/831 |
| 4,887,708 | A | * | 12/1989 | Brown et al. ................. 198/831 |
| 5,038,925 | A | * | 8/1991 | Chrysler ....................... 198/831 |
| 5,060,788 | A | * | 10/1991 | Compton et al. ............ 198/831 |
| 5,857,559 | A | * | 1/1999 | Gianvito et al. ............. 198/831 |

FOREIGN PATENT DOCUMENTS

JP          2000-007118 A          1/2000

* cited by examiner

Primary Examiner—Gene O. Crawford
(74) Attorney, Agent, or Firm—Frishauf, Holtz, Goodman & Chick, P.C.

(57) ABSTRACT

A curved conveyor is provided which includes at least a pair of supports arranged so that their axis lines mutually intersect at a desired angle, and an endless curve belt having a flat fan shape matching the angle which is supported on the respective supports so as to be able to run. An endless drive chain is formed along the outer circumference of the curved belt to be bendable in a running direction and in a direction orthogonal to the running direction by connecting multiple unit members to each other. Connecting members connect the unit members of the drive chain to the outer circumferential portions of the curved belt corresponding to the unit members, such that a driving force by the drive chain is applied to the outer circumferential side of the curved belt so as to run the curved belt in a curved manner at a desired angle.

5 Claims, 6 Drawing Sheets

CURVED CONVEYOR

DETAILED DESCRIPTION OF THE INVENTION

1. Field of the Invention

The present invention relates to a curved conveyor for conveying works in a curved manner at a desirable angle.

2. Prior Arts

Conventionally, for example, a curved conveyor as disclosed in Japanese Unexamined Patent Publication No. 2000-7118 has been known. This conveyor is constructed such that: a flat fan-shaped conveying belt is supported on first and second straight pulleys arranged so that their axis lines are mutually intersected at a desirable angle; an endless belt is provided in a manner wound around first and second rotor provided on the outer circumferential side of the respective first and second straight pulleys and in a manner supported on a plurality of guiding rolls arranged along the outer circumference of the conveying belt; and the endless belt and conveying belt are connected by multiple elastic bodies so as to drive the conveying belt on the outer circumferential side.

However, in the above-described curved conveyor, since it is necessary to run the endless belt while curving the same by the multiple guide rolls provided along the outer circumference of the conveying belt, the endless belt and conveying belt must be connected by the elastic bodies so as to absorb the difference in the radial distance between the parts supported by the guide rolls and guide rolls. Therefore, as a result of an elastic deformation of the elastic bodies, an excessive load intensively effect the outer circumferential side of the conveying belt, the conveying belt is thereby easily damaged, thus resulting in poor durability.

In addition, when conveying works, the endless belt is shifted by the work weight prior to the conveying belt, and as a result, the above-described elastic bodies are also elastically modulated in the circumferential direction. Consequently, a load in the circumferential direction as well as in the above-described radial direction effects the outer circumferential side of the conveying belt, the conveying belt is thereby easily damaged, thus resulting in further poor durability.

It is an object of the present invention to provide a curved conveyor which can avoid an excessive load intensively effecting the curved belt by applying a driving force from the outer circumferential portion of the curved belt for a conveying drive and thus can be improved in durability.

It is another object of the present invention to provide a curved conveyor which can be reduced in the number of components and thus can lower manufacturing costs.

PREFERRED EMBODIMENT

Hereinafter, the present invention will be described in detail by raising a curved conveyor 1 with a curved conveying angle of 90 degrees as an example.

Figure 1:
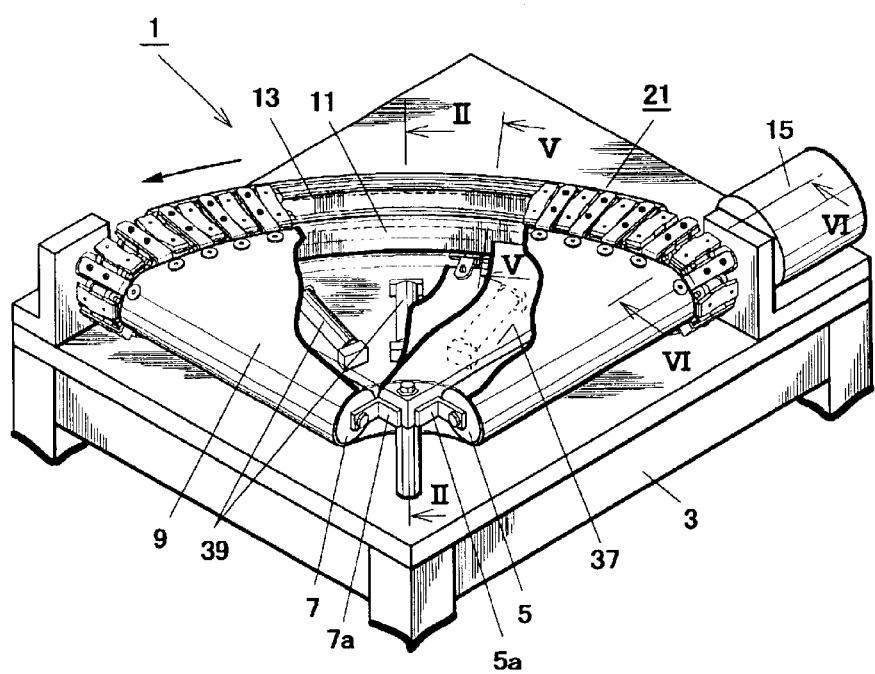
FIG. 1 is a general perspective view with a partial cut-away showing a curved conveyor.
Figure 2:
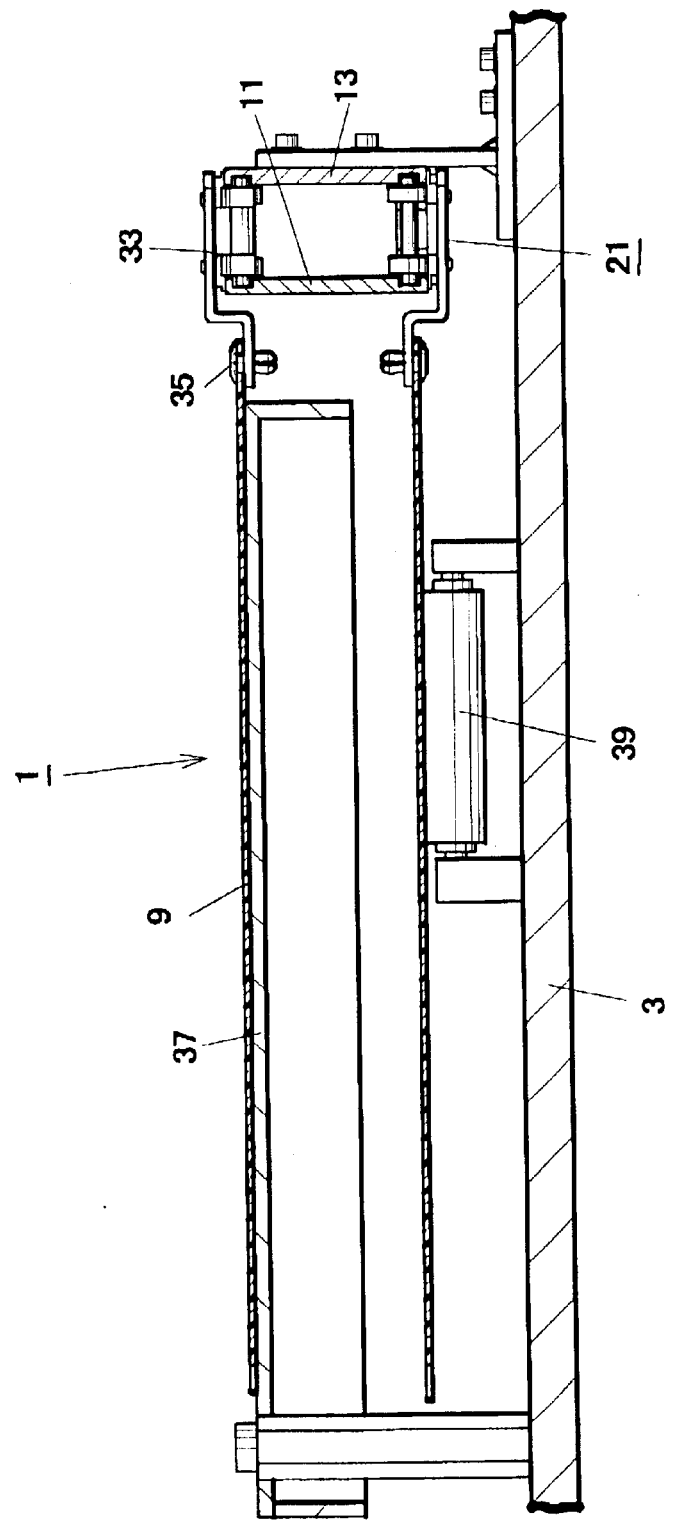
FIG. 2 is a longitudinal sectional view along the line II—II of FIG. 1.
Figure 3:
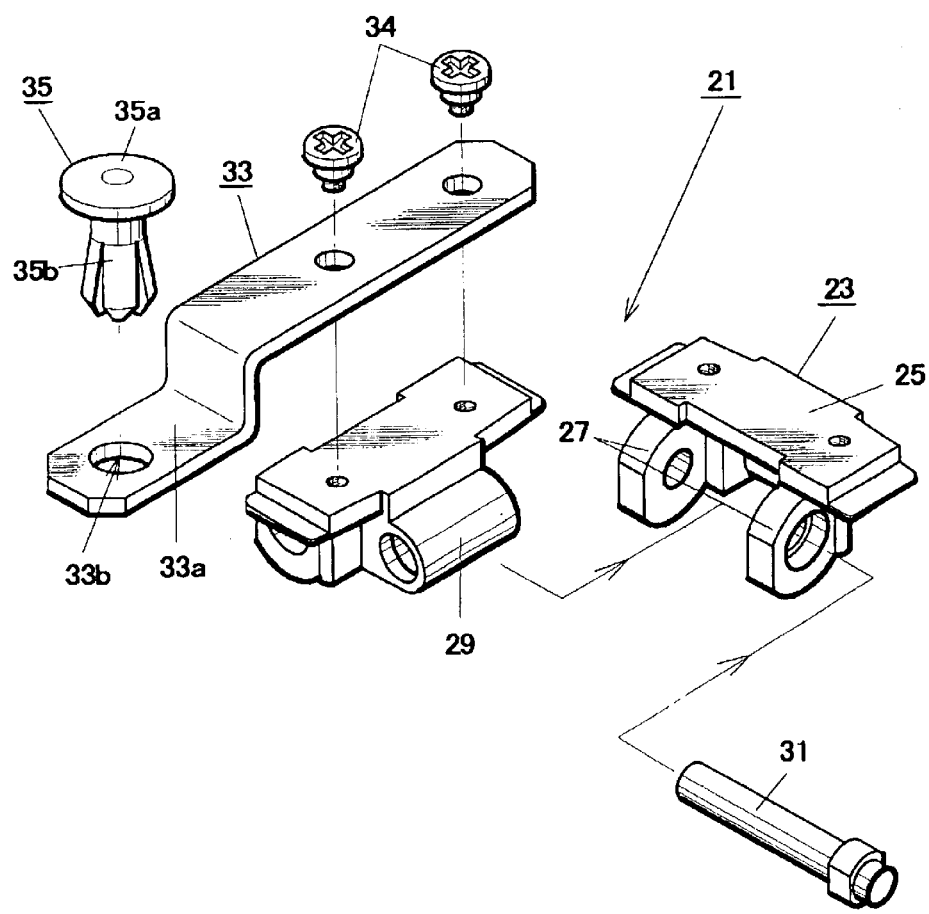
FIG. 3 is an exploded perspective view of a drive chain.
Figure 4:
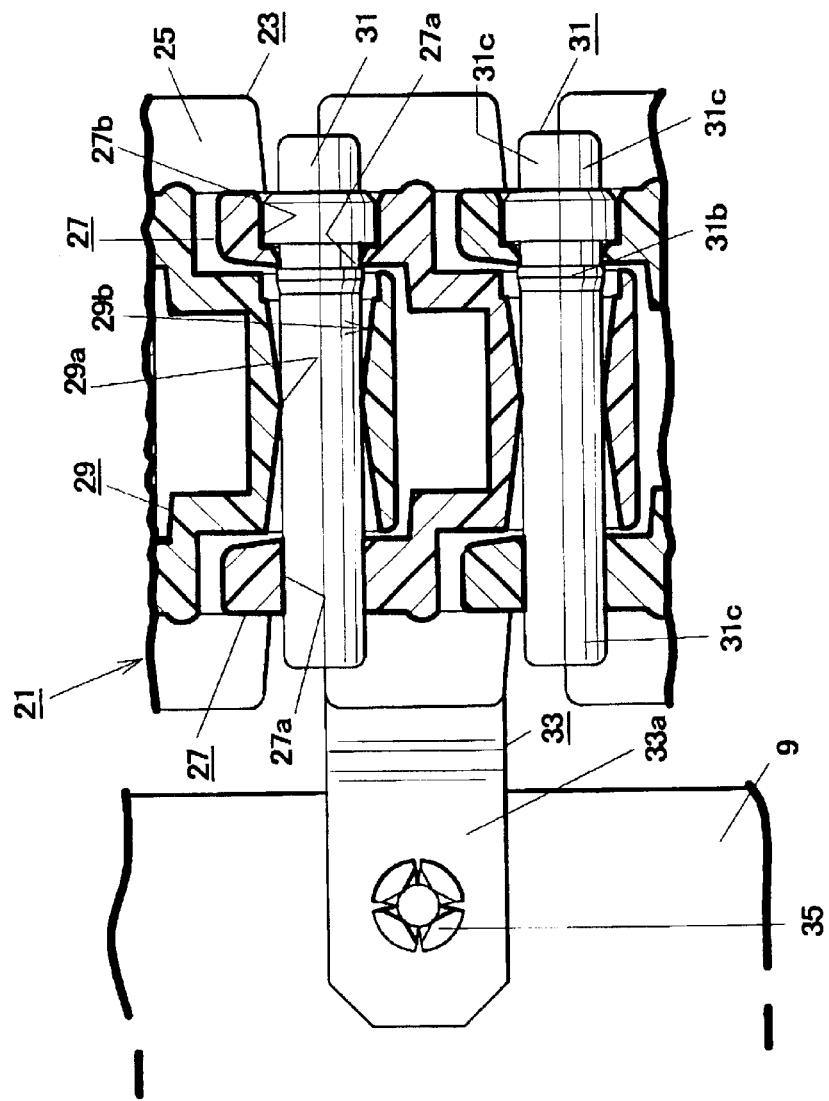
FIG. 4 is a cross-sectional view showing a unit member in a connected condition.
Figure 5:
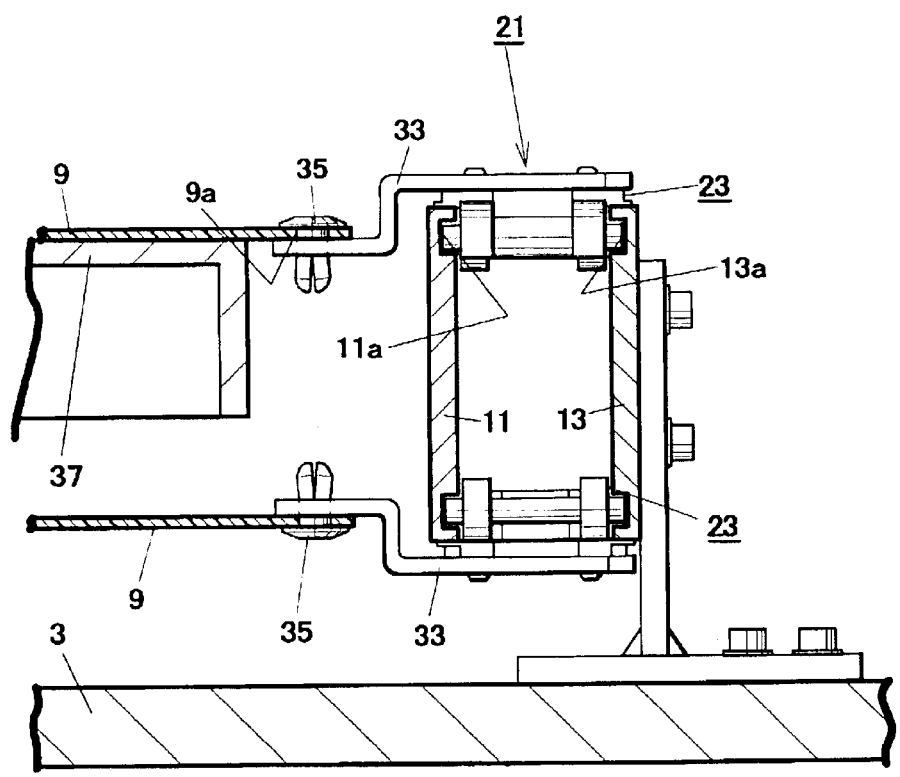
FIG. 5 is a longitudinal sectional view along the line V—V of FIG. 1.
Figure 6:
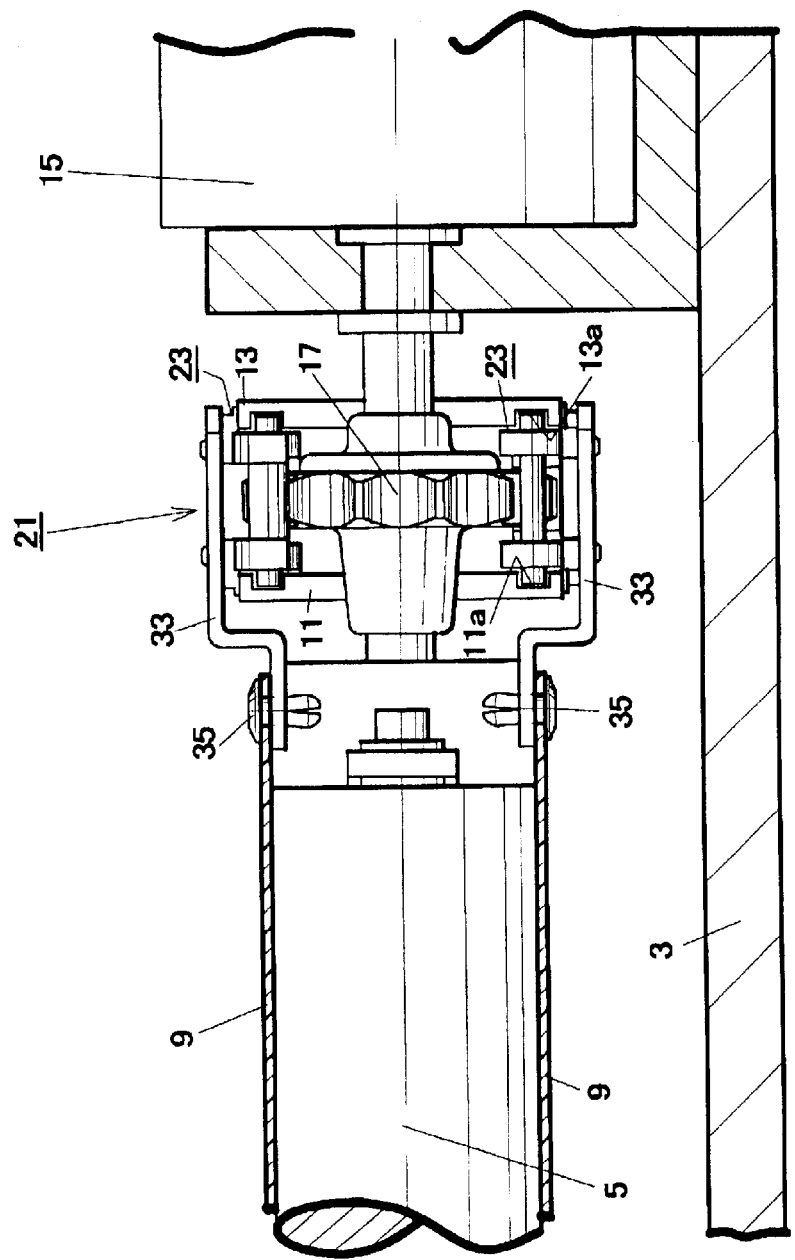
FIG. 6 is a longitudinal sectional view along the line VI—VI of FIG. 1.

In FIG. 1 through FIG. 6, two rotating supports 5 and 7 whose axis lines are mutually intersected at right angles are rotatably supported on a main frame 3. The respective rotating supports 5 and 7 are, in terms of their axis line length, slightly shorter than the width in a direction perpendicular to the conveying direction of a conveying belt 9 (which will be described later) and have an unsupported condition with respect to the outer peripheral rim of the curved belt 9. Across the respective rotating supports 5 and 7, a flat fan-shaped, endless curved belt 9 is stretched, and on the main frame 3 located on the outer circumferential side of the curved belt 9, a pair of chain guide members 11 and 13 opposed at an predetermined interval are provided along the outer circumference of the curved belt 9. The respective chain guide members 11 and 13 are, for example, shaped aluminum materials, which are formed into a curved shape to coincide with a curvature of the bending belt 9. On the inner surfaces of the upper portion and lower portion of the respective chain guide members 11 and 13, guide grooves 11a and 13a for guiding a drive chain 21 (which will be described later) in running are formed so as to be extended in the longitudinal direction.

To one end-portion side of the respective chain guide members 11 and 13, provided is a drive sprocket 17 connected to an electric motor 15 via a decelerating mechanism (not illustrated) where necessary, and to the other end-portion side, provided is a driven sprocket (not illustrated). With the drive sprocket 17 and driven sprocket, engaged is an endless drive chain 21 supported on the chain guide members 11 and 13 so as to run in a curved manner. The drive chain 21 is driven to run in a predetermined direction by the drive sprocket 17 for rotating drive.

The drive chain 21 is constructed by mutually connecting multiple unit members 23 so as to swing in a direction perpendicular to the running direction and bend at a desirable angle in the running direction. The respective unit members 23 are made of a synthetic resin having abrasion resistance and a high tensile strength, such as POM (polyacetal), PET (polyethylene terephthalate), PP (polypropylene), and PBT (polybutylene terephthalate), or a composite reinforced resin of these resins containing reinforcing fibers such as carbon fibers.

At one end of the flat plate 25 of each unit member 23, integrally formed are a pair of axial supporting portions 27 dropping at a predetermined interval, and at the other side, integrally formed is a bearing portion 29 located between the axial supporting portions 27 of an adjacent unit member 23. In the respective axial supporting portions 27, formed is an axial supporting hole 27a having an inside diameter which is approximately coincident with the outside diameter of a connect pin 31 (which will be described later), and of these, on the outside of one axial supporting portion 27, a large-diameter recess 27b is formed concentrically with the axial supporting hole 27a. In the bearing portion 29, formed is a bearing hole 27a having an axis line in a direction perpendicular to the conveying direction, and this bearing hole 29a is formed on an annular tapered surface 29b whose inside diameter is smallest at its middle portion in the axis-line direction and gradually increases from the middle portion toward both sides. The degree of tapering of the annular tapered surface 29b is determined based on a bending curvature when the drive chain 21 is run in a curved manner.

For example, in order to run the drive chain 21 with a small curvature, the degree of tapering is set small, and in contrast thereto, with a large curvature, the degree of tapering is set large. When the degree of tapering is increased, the drive chain 21 is likely to shake during running, therefore, the degree of tapering is appropriately set based on a required curvature of the curved channel and the degree of shaking.

While the bearing portion 29 of the adjacent unit member 23 is arranged between the axial supporting portions 27 of the unit member 23, the unit members 23 are mutually connected by inserting a connect pin 31 from the side of one axial supporting portion 27 with the large-diameter portion 27 formed toward the other axial supporting portion 27. The connect pin 31 is formed, from a synthetic resin identical in the type to the unit members 23, to have an axis line length longer than the distance between the axial supporting portions 27 and an outside diameter allowing insertion and fitting into the bearing hole 27a. At one axial end portion of the connect pin 31 located on the side of the axial supporting portion 27 with the large-diameter recess 27b formed, integrally formed are a bulged portion 31b which is fittable into the large-diameter recess 27b and an engaging protruded thread 31b at a position with a width in the axis-line direction of the axial supporting hole 27a from the bulged portion 31a toward the middle portion in the axis-line direction. When this connect pin 31 connects adjacent unit members 23 to each other, both end portions of its axis are protruded outside by an appointed axis-line length, thereby constructing guide portions 31c which slide inside the guide grooves 11a and 13a of the chain guide members 11 and 13. In a manner where the drive sprocket 17 and driven sprocket teeth are respectively engaged with the axial supporting portions 27 and bearing portion 29 of the respective unit members 23, the drive chain 21 where the guide portions 31c of the connect pin 31 are supported so as to slide inside the supporting grooves 11a and 13a is run in a predetermined direction by the driven motor 15.

To the flat plate 25 of the unit member 23 at intervals of an appropriate number, a connecting member 33 is fixed by screws 34. Although the drawings show an example where the connecting member 33 is attached at every other unit member 23, the present invention is not limited to the illustrated example, and as long as the connecting members 33 do not interfere with each other, the connecting member 33 may be attached to every unit member 23 or each plurality of unit members 23. In each connecting member 33, formed is a supporting portion 33a which drops, at the outer circumferential side of the curved belt 9, that is, at the inner circumferential side of the drive chain 21, with a width reaching the pitch circle of the drive sprocket 17 and driven sprocket and then extends in the horizontal direction and supports the lower surface of the outer circumferential portion of the curved belt 9, and a passing hole 33b is formed in the supporting portion 33a.

On the other hand, on the outer circumference portion of the curved belt 9, through holes 9a are formed at a pitch approximately coincident with the interval between the respective connecting members 33. The curved belt 9 and drive chain 21 are connected by fixing pins 35 which are each inserted through the through hole 9a and passing hole 33b. The fixing pins 35 each consist of a flat portion 35a to be latched with the upper surface of the curved belt 9 on the rim of the through hole 9a and a shaft portion 35b to be inserted through the through hole 9a and passing hole 33b, and this shaft portion 35b can be elastically deformed as a result of split grooves on its tip portion, and in general, this is formed to have a diameter slightly greater than that of the passing hole 33b.

Moreover, to the upper portion of the chain guide members 11 and 13 and brackets 5a and 7a to support the rotating supports 5 and 7, attached is a supporting plate 37 whose flat surface is a fan shape approximately coinciding in size with the curved belt 9 and which supports the inner surface of the curved belt 9 located above. In addition, on the main frame 3, provided are a plurality of rotating support members 39 to support the lower surface of the curved belt 9 located below.

Next, curved conveying operations of the curved conveyor 1 constructed as in the above will be described.

To the charging side and discharging side of the curved conveyor 1, a linear charging unit and a linear discharging unit (either not illustrated), for example, a belt conveyor, a roller conveyor, etc., are connected, respectively, and works charged by the linear charging unit are, by being turned at a 90 degree angle by the curved conveyor 1, transferred onto the linear discharging unit so as to be conveyed.

Now, when the drive sprocket 17 is rotated by driving the electric motor 15, the drive chain 21 supported on the chain guide members 11 and 13 is run in a direction of the illustrated solid-line arrow while the respective unit members 23 are mutually bent according to a curve of the chain guide members 11 and 13. Thereby, in the illustrated example, the curved belt 9 is driven from the outer circumferential side by the connecting members 33 provided on the individual unit members 23 and is run in the illustrated solid-line arrow direction, so that works are conveyed while being turned at a 90 degree angle.

Since the above-described drive chain 21 runs in a curved manner while the unit members 23 are mutually bent according to a curve of the chain guide members 11 and 13, in the illustrated example, to the outer circumferential portion of the curved belt 9 connected by the connecting members 33 provided for the individual unit members 23, a driving force is approximately uniformly applied along its curve, whereby an excessive load onto the curved belt 9 is avoided. In addition, in a condition where the drive sprocket 17 and driven sprocket are engaged with the respective unit members 23 of the drive chain 21, an interval between the upper portions of the respective unit members 23 is expanded. Even in this case, the supporting portion 33a of the connecting member 33 drops to coincide with the pitch circle of the drive sprocket 17 and driven sprocket and is connected to the curved belt 9, therefore, the interval between the supporting portions 33a is kept fixed, the connection interval to the outer circumferential portion of the curved belt 9 is maintained fixed, whereby a forcible expansion of the outer circumferential portion of the curved belt 9 is avoided.

The present invention can be modified and carried out as follows:

1. In the above description, both end sides of the curved belt 9 have been supported by the rotating supports 5 and 7, however, the same can be run in a manner supported by supports made of, for example, a polyamide resin excellent in slidability.

2. In the above description, the supporting portion 33a of the connecting member 33 and the outer circumferential portion of the curved belt 9 have been connected by the fixing pins 35, however, as the fixing pin, a knob can be integrally formed on the upper portion of the flat portion 35a, so that the fixing pin can be attached and detached by use of the knob when the curved belt 9 is replaced.

3. In the above description, the curved conveyor 1 for changing the conveying direction at 90 degrees has been described as an example, however, curved conveyors can be constructed so that their changing angles in the conveying direction become 30 degrees or 45 degrees, and the plurality of curved conveyors different in the conveying-direction changing angle can be combined to create a desirable conveying-direction changing angle.

What is claimed is:

1. A curved conveyor comprising:

at least a pair of supports arranged such that axis lines thereof mutually intersect at a predetermined angle;

an endless curved belt which has a flat fan shape matching the angle, and which is supported on the supports so as to be adapted to run;

an endless drive chain which is bendable in a running direction and in a direction orthogonal to the running direction, and which runs along an outer circumference of the curved belt, wherein the endless drive chain is formed by connecting multiple unit members to each other;

a drive member which engages with said drive chain to drive the drive chain in a predetermined direction; and connecting members for connecting the unit members of the drive chain to outer circumferential portions of the curved belt corresponding to said unit members;

wherein a driving force of the drive chain which runs in a curved manner in the predetermined direction as a result of a drive of the driving member is applied to an outer circumferential side of the curved belt so as to run the curved belt in a curved manner at a predetermined angle;

wherein each unit member of the drive chain comprises:

a pair of axial supporting portions provided at one side of the unit member in the running direction in an opposed manner at a predetermined interval in the direction orthogonal to the running direction, wherein each axial supporting portion includes an axial supporting hole through which a fixing pin is inserted; and a bearing portion provided at the other side of the unit member in the running direction so as to be located between the axial supporting portions of an adjacent unit member, wherein the bearing portion includes a bearing hole which has an axis line in the direction perpendicular to the running direction and which has a smallest inside diameter in a direction perpendicular to the axis-line direction at a middle portion thereof and wherein the inside diameter gradually increases from the middle portion in the axis-line direction toward each side;

wherein a fixing member is adapted to be inserted through the axial supporting holes of the axial supporting portions of the adjacent unit member and the bearing hole the bearing portion; and wherein the unit members of the drive chain are connected so as to be swingable with respect to each other at an angle determined by a difference in the inside diameter of the bearing hole from the middle portion in the axis-line direction to each side.

2. The curved conveyor according to claim 1, wherein the driving member comprises a drive sprocket connected to an electric motor respectively provided on an extended line in a radial direction of the supports, and a driven sprocket, and wherein the drive chain is engaged with the sprockets so as to be driven.

3. The curved conveyor according to claim 1, wherein each connecting member is fixed to an upper surface of one of the unit members on a part of the drive chain, wherein each connecting member includes a supporting portion dropping from an inner circumferential side portion of the drive chain to an outer circumferential position of the driving member, and wherein the supporting portion is connected to the outer circumferential portion of the curved belt.

4. The curved conveyor according to claim 1, wherein the fixing member is longer in an axis-line length thereof than the predetermined interval between the axial supporting portions, and wherein when the unit members are mutually connected, both end portions of the fixing member protrude from respective axial supporting portions and are slidably supported by a pat of guide members, to thereby guiding the drive chain.

5. The curved conveyor according to claim 4, wherein the guide members are formed in a curved manner along the outer circumference of the curved belt and include, on at least an upper portion of opposed inner surfaces thereof, a groove extending in a longitudinal direction, and wherein both end portions of the fixing member are supported on the groove so as to be slidably fitted therein.

* * * * *